US006470360B1

(12) United States Patent
Vaitheeswaran

(10) Patent No.: US 6,470,360 B1
(45) Date of Patent: Oct. 22, 2002

(54) DATABASE SYSTEM WITH IMPROVED METHODOLOGY FOR PAGE ALLOCATION

(75) Inventor: Girish Vaitheeswaran, Sunnyvale, CA (US)

(73) Assignee: Sybase, Inc., Dublin, CA (US)

( * ) Notice: Subject to any disclaimer, the term of this patent is extended or adjusted under 35 U.S.C. 154(b) by 0 days.

(21) Appl. No.: 09/467,738

(22) Filed: Dec. 20, 1999

(51) Int. Cl.$^7$ ............................................... G06F 17/30
(52) U.S. Cl. ........................ 707/205; 707/2; 707/206; 711/129
(58) Field of Search ................................ 707/205, 206, 707/2; 711/129

(56) References Cited

U.S. PATENT DOCUMENTS

| | | | | |
|---|---|---|---|---|
| 4,536,837 A | * | 8/1985 | Olson et al. ................. | 707/205 |
| 4,989,132 A | | 1/1991 | Mellender et al. .......... | 395/705 |
| 5,265,245 A | * | 11/1993 | Nordstrom et al. ............. | 707/8 |
| 5,452,445 A | | 9/1995 | Hallmark et al. ............... | 707/2 |
| 5,680,573 A | | 10/1997 | Rubin et al. .................. | 711/129 |
| 5,706,467 A | * | 1/1998 | Vishlitzky et al. .......... | 711/129 |
| 5,717,919 A | | 2/1998 | Kodavalla et al. ............. | 707/8 |
| 5,794,228 A | * | 8/1998 | French et al. ................... | 707/2 |
| 5,812,996 A | | 9/1998 | Rubin et al. .................... | 707/2 |
| 5,822,749 A | | 10/1998 | Agarwal ......................... | 707/2 |
| 5,909,694 A | * | 6/1999 | Gregor et al. ............... | 711/128 |
| 5,991,775 A | * | 11/1999 | Beardsley et al. .......... | 707/205 |
| 6,061,763 A | | 5/2000 | Rubin et al. ................. | 711/129 |
| 6,249,792 B1 | * | 6/2001 | Zwilling et al. ............. | 707/205 |

* cited by examiner

*Primary Examiner*—Charles L. Rones
(74) *Attorney, Agent, or Firm*—John A. Smart

(57) ABSTRACT

A database system providing a methodology for optimized page allocation is described. During page allocation in the system, once an allocation page with free space has been located in the system's global allocation map or GAM (i.e., using routine page allocation steps), the page identifier for that allocation page is stored in a hint array, as part of that object's (i.e., table's) object descriptor or des. For a table undergoing a lot of splits (i.e., insert-intensive object), the system may store an array of allocation page "hints" (allocation page identifiers) in the des for that object (e.g., table). The array itself comprises a cache of slots (e.g., eight slots), each of which stores an allocation page identifier ("hint") obtained from the GAM (from a GAM traversal occurring during the page allocation process) or is empty (i.e., has not been filled from the GAM and is therefore set to the initial value of null). For example, the first slot may store the page identifier for one allocation page. A second slot may store the page identifier for another, completely different allocation page, and so forth and so on. On subsequent passes through the page allocation process, the system can, rather than going to the GAM, randomly select (e.g., randomly hash on) a particular slot of the cache. In this manner, the incoming clients will, instead of competing for the same first-available allocation page, randomly select among multiple available allocation pages. Since each allocation page itself is protected by a separate latch, the system is able to decrease contention during the page allocation process by randomly accessing different elements of the "hint" array. In this manner, the system can avoid the computationally-expensive process of page allocation that is usually required as well as avoid contention for the first-available allocation page.

35 Claims, 13 Drawing Sheets

DATABASE SYSTEM WITH IMPROVED METHODOLOGY FOR PAGE ALLOCATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

COMPUTER PROGRAM LISTING APPENDIX

A Computer Program Listing Appendix, containing one (1) total file on compact disc, is included with this application.

BACKGROUND OF THE INVENTION

The present invention relates generally to database systems and, more particularly, to optimization of page allocation (e.g., of data pages or the like) in such systems.

The present invention relates generally to information processing environments and, more particularly, to optimization of page allocation (e.g., of data pages or the like) in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without user knowledge of underlying system implementation. In this manner, the DBMS provides users with a conceptual view of the database that is removed from the hardware level. The general construction and operation of a database management system is known in the art. See e.g., Date, C., *An Introduction to Database Systems*, Volume I and II, Addison Wesley, 1990; the disclosure of which is hereby incorporated by reference.

DBMS systems have long since moved from a centralized mainframe environment to a de-centralized or distributed environment. One or more PC "client" systems, for instance, may be connected via a network to one or more server-based database systems (SQL database server). Commercial examples of these "client/server" systems include Powersoft™ clients connected to one or more Sybase Adaptive Server™ database servers (formerly, Sybase SQL Server™). Both Powersoft™ and Sybase Adaptive Server™ are available from Sybase, Inc. of Emeryville, Calif.

To support multiple clients concurrently accessing data, a database system must employ some sort of concurrency control. Concurrency control is the way that a database synchronizes clients' or users' access to data to ensure that they do not destroy each other's work. Locking is the way that most databases handle concurrency control. While one user has a lock on a subset of the database, that data is "blocked" or protected from other users' attempts to make changes to it. One user's changes have to be "committed" before another user can see or further change the same data.

As the migration to client/server continues, each day more and more businesses are run from mission-critical systems which store information on server-based SQL database systems, such as Sybase Adaptive Server™. As a result, increasingly higher demands are being placed on server-based SQL database systems to provide enterprise-wide decision support. Accordingly, there is much interest in improving the performance of such system, particularly in terms of execution speed and reliability.

Increasingly, database servers are deployed on multi-processor computers, such as Hewlett-Packard's V-class UNIX-based machines (e.g., HP V2500 RISC-based computer) running on a 64-bit operating system (e.g., HP UNIX). In such a configuration, multiple instances of the database server software are run, one instance (e.g., UNIX process) per processor, all operating on a single shared memory (e.g., 32 GB of main memory). Expectedly, as the number of processors is increased, the contention on the single shared memory—a critical system resource—also increases. As soon as contention for the shared memory arises, each of the multiple processes will encounter wait states, such as "spinning" (e.g., consuming CPU cycles while waiting availability of a spin lock), or will stall in order to wait for its turn for access to the shared memory. As a result, overall system scalability and hence throughput suffer.

Thus today, the contention on shared memory poses a bottleneck to true scalability for database servers running on multi-processor computers. Moreover, the problem is particularly acute in environments employing database servers for online transaction processing (OLTP), such as e-commerce applications, where contention is exacerbated by a high number of concurrent transactions. What is really desired is for the database system to scale in relation (e.g., linearly) to the number of processors added, so that system throughput scales accordingly. The present invention includes optimization techniques that assist in reaching that ideal goal.

SUMMARY OF THE INVENTION

In a multiuser database environment with a large number of clients performing a large number of transactions (e.g., inserts, updates, and deletes), such as an OLTP application executing hundreds of transactions per minute for providing e-commerce support, a huge number of database page splits occur. In such a scenario, the system must frequently access the database's allocation pages in order to update the information pertaining to page-management housekeeping. Each allocation page is protected in this concurrent environment using a latch. Since the conventional approach is for the database system to traverse a chain of allocation pages and grab the first available allocation page, the net result is that the latch protecting the allocation page becomes a single point of contention in a high-volume transaction environment.

The present invention comprises a Client/Server Database System with improved page allocation methodology, particularly applicable in a multiprocessor database configuration. In an exemplary embodiment, the system includes one or more Clients (e.g., Terminals or PCs executing client database access software) connected via a Network to a Server. The Server, operating under a server operating system (e.g., UNIX), includes a Database Server System, such as Sybase Adaptive Server™. In general operation, Clients store data in and retrieve data from one or more database tables resident on the Server by submitting SQL commands, some of which specify "queries"—criteria for selecting records of a table for a particular operation (e.g., updating). Queries that modify data are typically provided using a data manipulation language (DML), such as using the DML capabilities of the well-known SQL syntax.

The present invention introduces a methodology for optimized page allocation, using the following approach. During page allocation, once an allocation page with free space has been located in the system's global allocation map or GAM (i.e., using routine page allocation steps), the page identifier for that allocation page is stored in a hint array, as part of that object's (i.e., table's) object descriptor or des. For a table undergoing a lot of splits (i.e., insert-intensive object), the system may store an array of allocation page "hints" (allocation page identifiers) in the des for that object (e.g., table). The array itself comprises a cache of some number of slots (e.g., eight slots), each of which stores an allocation page identifier ("hint") obtained from the GAM (from a GAM traversal occurring during the page allocation process) or is empty (i.e., has not been filled from the GAM and is therefore set to the initial value of null). For example, the first slot may store the page identifier for one allocation page. A second slot may store the page identifier for another, completely different allocation page, and so forth and so on. On subsequent passes through the page allocation process, the system can, rather than going to the GAM, randomly select (e.g., randomly hash on) a particular slot of the cache. The random hash may be done in a conventional manner, such as using the Standard C rand function; see e.g., Microsoft Developer Network Library/Visual Studio 6.0, Part Number X03-55262, available from Microsoft Corp. of Redmond, Wash., the disclosure of which is hereby incorporated by reference. In this manner, the incoming clients will, instead of competing for the same first-available allocation page, randomly select among multiple available allocation pages. Since each allocation page itself is protected by a separate latch, the system is able to decrease contention during the page allocation process by randomly accessing different elements of the "hint" array. In this manner, the system can avoid the computationally-expensive process of page allocation that is usually required as well as avoid contention for the first-available allocation page.

DETAILED DESCRIPTION OF A PREFERRED EMBODIMENT

The following description will focus on the presently preferred embodiment of the present invention, which is operative in a network environment executing SQL client/server database applications on a multiprocessor platform running under a multiprocessor operating system. The present invention, however, is not limited to any particular application or environment. Instead, those skilled in the art will find that the present invention may be advantageously applied to any application or environment where optimization of database performance is desirable, including non-SQL data processing systems and the like, and may be advantageously embodied on a variety of different platforms, including Macintosh, Linux, BeOS, Solaris, UNIX, NextStep, and the like. The description of the exemplary embodiments which follows is, therefore, for the purpose of illustration and not limitation.

Computer-based Implementation

A. Basic system hardware (e.g., for desktop and server computers)

Figure 1A:
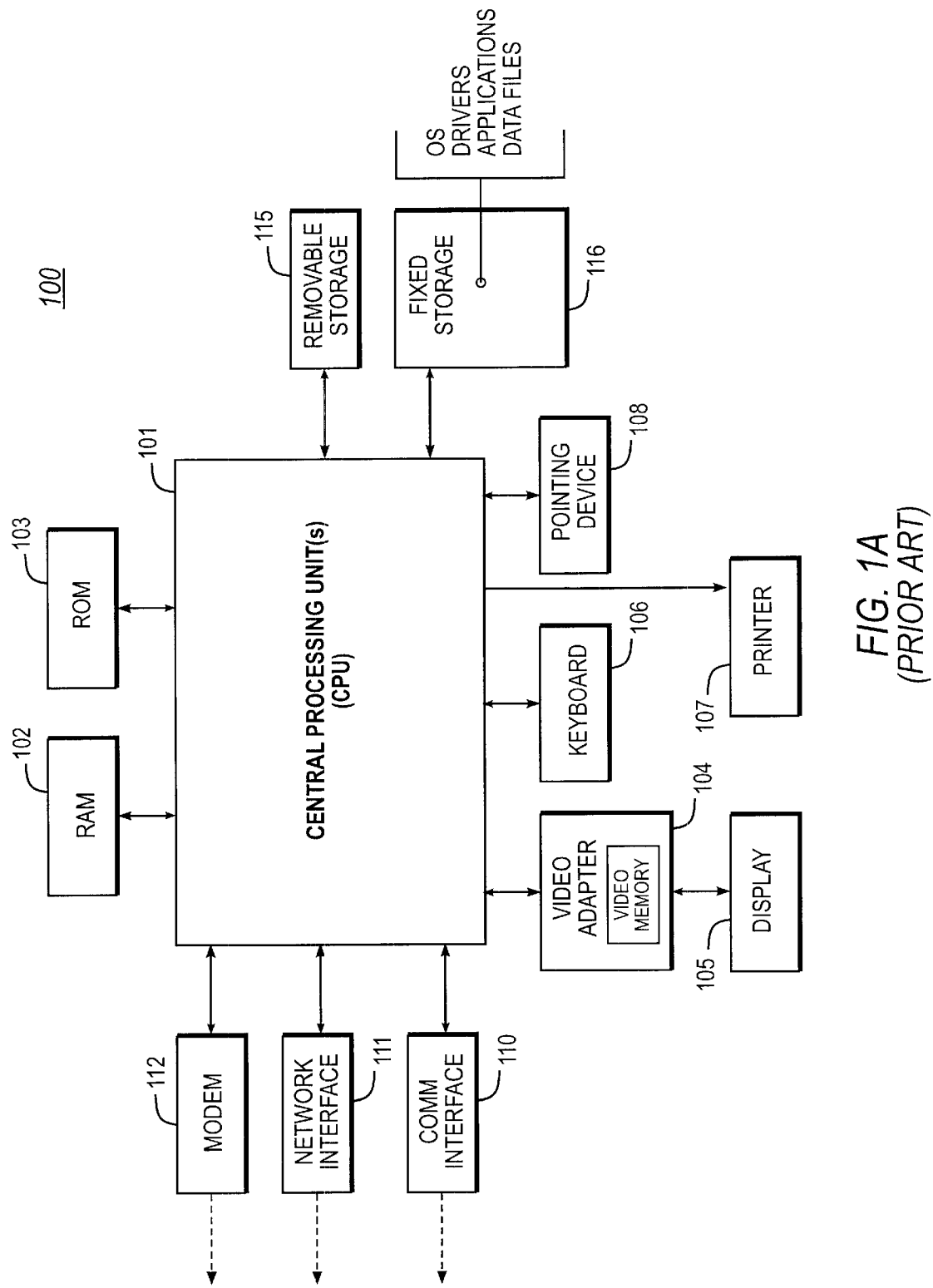
FIG. 1A (Prior Art) is a block diagram illustrating a computer system in which the present invention may be embodied.

The present invention may be implemented on a conventional or general-purpose computer system, such as an IBM-compatible personal computer (PC) or server computer. FIG. 1A is a very general block diagram of an IBM-compatible system 100. As shown, system 100 comprises a central processor unit(s) (CPU) 101 coupled to a random-access memory (RAM) 102, a read-only memory (ROM) 103, a keyboard 106, a pointing device 108, a display or video adaptor 104 connected to a display device 105, a removable (mass) storage device 115 (e.g., floppy disk), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration for a client machine, RAM of 32 MB or more is employed; for a server machine, RAM on the order of several gigabyte is typical. More or less memory may be used without departing from the scope of the present invention. The read-only memory (ROM) 103 contains the basic input output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 1A, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display screen 105. Likewise, the pointing device 108, such as a mouse, track ball, pen device, or the like, permits selection and manipulation of objects on the display screen. In this manner, these input devices support manual user input for any process running on the system.

The computer system displays text and/or graphic images and other data on the display device 105. Display device 105 is driven by the video adapter 104, which is interposed between the display 105 and the system. The video adapter 104, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Mackintosh), which are available from Apple Computer of Cupertino, Calif., and Sun Solaris workstations, which are available from Sun Microsystems of Mountain View, Calif.

The above-described system 100 is presented for purposes of illustrating the basic hardware underlying desktop (client) and server computer components that may be employed in the system of the present invention. For purposes of discussion, the following description will present examples in which it will be assumed that there exists a client machine (e.g., desktop "PC") having application software locally that, in turn, is connected to a "server" or remote device having information of interest to the ultimate end-user. The present invention, however, is not limited to any particular environment or device configuration. In particular, a client/server distinction is neither necessary to the invention nor even necessarily desirable, but is used to provide a framework for discussion. Instead, the present invention may be implemented in any type of computer system or processing environment capable of supporting the methodologies of the present invention presented in detail below.

B. Basic system software

Figure 1B:
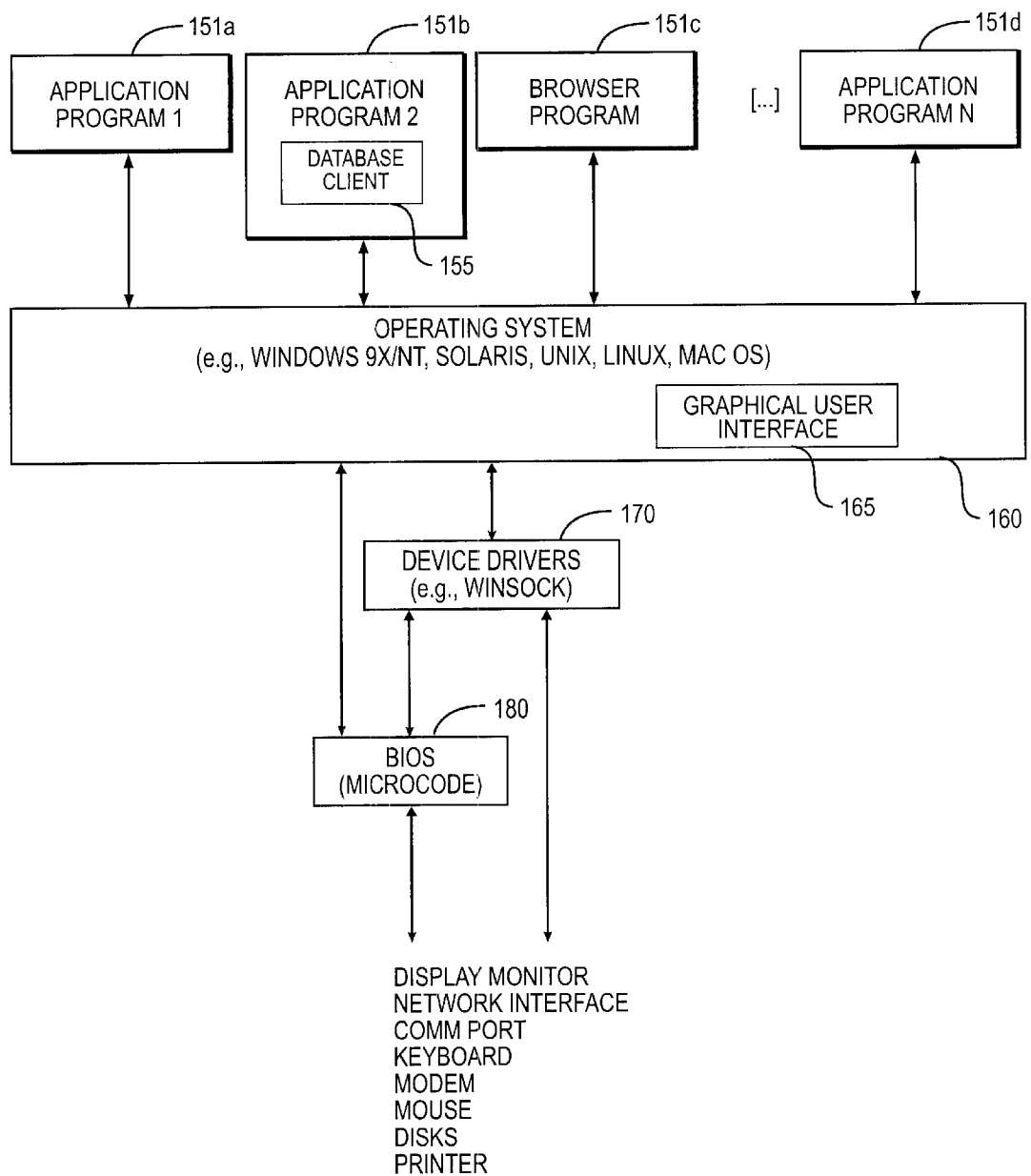
FIG. 1B is a block diagram illustrating a software subsystem for controlling the operation of the computer system of FIG. 1A.

Illustrated in FIG. 1B, a computer software system 150 is provided for directing the operation of the computer system 100. Software system 150, which is stored in system memory 102 and on fixed storage (e.g., hard disk) 116, includes a kernel or operating system (OS) 160. The OS 160 manages low-level aspects of computer operation, including managing execution of processes, memory allocation, file input and output (I/O), and device I/O. One or more application programs, such as client application software or "programs" 151 (e.g., 151a, 151b, 151c) may be "loaded" (i.e., transferred from fixed storage 116 into memory 102) for execution by the system 100.

System 150 includes a graphical user interface (GUI) 165, for receiving user commands and data in a graphical (e.g., "point-and-click") fashion. These inputs, in turn, may be acted upon by the system 100 in accordance with instructions from operating system 160, and/or client application module(s) 151. The GUI 165 also serves to display the results of operation from the OS 160 and application(s) 151, whereupon the user may supply additional inputs or terminate the session. Typically, the OS 160 operates in conjunction with device drivers 170 (e.g., "Winsock" driver) and the system BIOS microcode 180 (i.e., ROM-based microcode), particularly when interfacing with peripheral devices. For client machines, OS 160 can be provided by a conventional operating system, such as Microsoft® Windows 9x, by Microsoft® Windows NT, or by Microsoft® Windows 2000, all available from Microsoft Corporation of Redmond, Wash. Alternatively, OS 160 can also be an alterative operating system, such as IBM OS/2 (available from IBM of Armonk, N.Y.) or Macintosh OS (available from Apple Computers of Cupertino, Calif.). As described below, for the server machine, the operating system is preferably a server-based operating system supporting multiple processors.

As shown, the system 150 includes a Relational Database Management System (RDBMS) client or "front-end" 155, which itself may comprise any one of a number of database front-ends, including PowerBuilder™, dBASE®, Paradox®, Microsoft® Access, or the like. In an exemplary embodiment, the front-end will include SQL access drivers (e.g., ODBC (Open Database Connectivity) drivers, JDBC (Java Database Connectivity) drivers, native SQL (e.g., Sybase, Oracle, or the like) drivers, and so forth) for accessing SQL database server tables in a Client/Server environment.

Client/Server Database Management System

A. Basic architecture

Figure 2A:
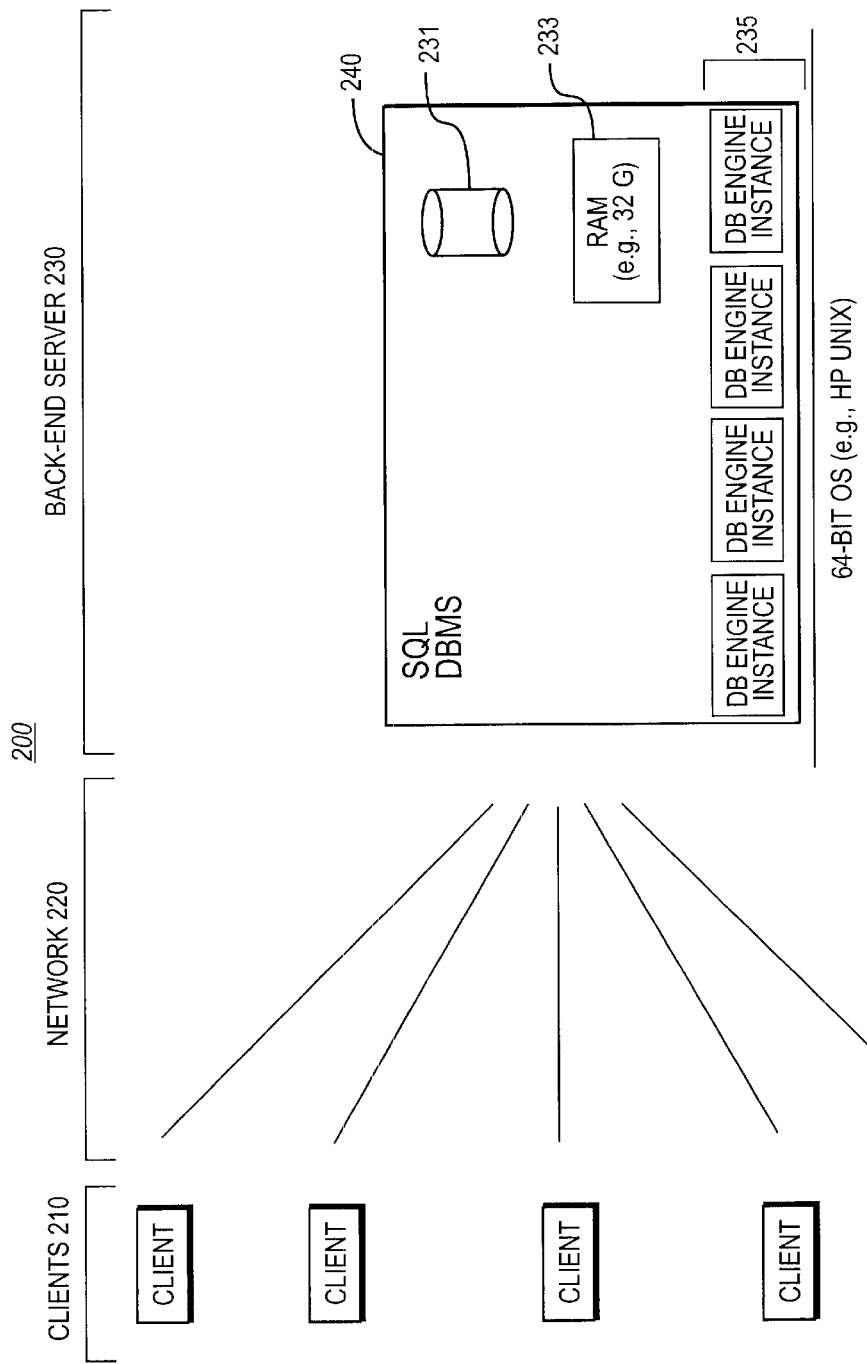
FIGS. 2A–B are block diagrams of a client/server system in which the present invention is preferably embodied, with FIG. 2B providing a more detailed view of the database engine instance in FIG. 2A.

While the present invention may operate within a single (standalone) computer (e.g., system 100 of FIG. 1A), the present invention is preferably embodied in a multi-user computer system, such as a client/server system. FIG. 2A illustrates the general structure of a Client/Server Database System 200 which is preferred for implementing the present invention. As shown, the system 200 comprises one or more Client(s) 210 connected via a Network 220 to a Back-end Server 230 having an SQL Database Server System 240. Specifically, the Client(s) 210 comprise one or more standalone devices connected to a Database Server System 240 using a conventional network. In an exemplary embodiment, the clients may themselves comprise a plurality of standalone workstations, dumb terminals, or the like, or comprise personal computers (PCs) such as the above-described system 100. Typically, such units would operate under a client operating system, such as Microsoft Windows 9x or 2000 for PC clients.

The Database Server System 240, which comprises Sybase Adaptive Server™ (Sybase, Inc. of Emeryville, Calif.) in an exemplary embodiment, generally operates as an independent process (i.e., independently of the clients) running under a server operating system such as Microsoft Windows NT (Microsoft Corp. of Redmond, Wash.), NetWare (Novell of Provo, Utah), or UNIX (Novell). In a preferred embodiment, the Database Server System 240 is deployed on a multi-processor computer, such as Hewlett-Packard's V-class UNIX-based machines (e.g., HP V2500 RISC-based computer) running on a 64-bit operating system (e.g., HP UNIX). In such a configuration, multiple engine instances 235 of the database server software run concurrently, one instance (e.g., UNIX process) per processor, all operating on a single shared memory 233 (e.g., 32 GB of main memory) with access to a persistent storage repository (e.g., disk) 231. The engines 235 are described in further detail below. The Network 220, on the other hand, may be any one of a number of conventional network systems, including a Local Area Network (LAN) or Wide Area Network (WAN), as is known in the art (e.g., using Ethernet, IBM Token Ring, or the like, communicating using a communication protocol, such as TCP/IP). The Network includes functionality for packaging client SQL calls and its parameters into a format (of one or more packets) suitable for transmission across a cable or wire, for delivery to the Database Server System 240.

Figure 2B:
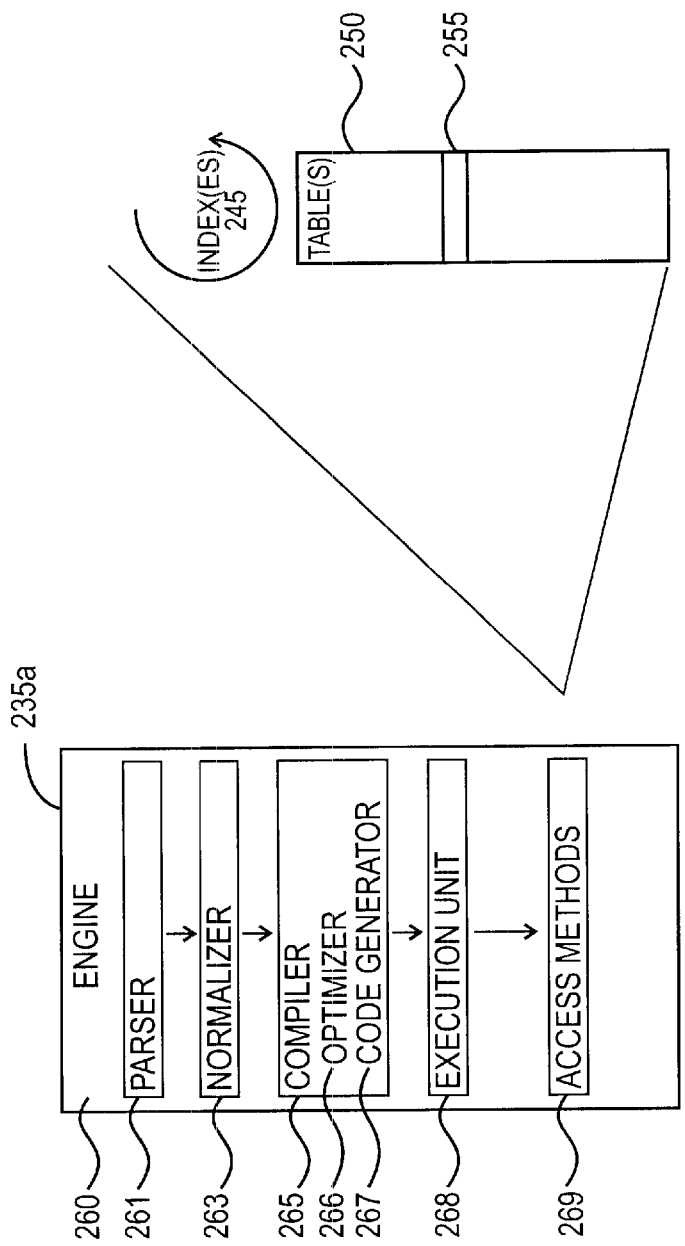

In operation, the Client(s) 210 store data in or retrieve data from one or more database tables, such as the table 250 shown more particularly in FIG. 2B. Typically resident on the Back-end Server 230, each table itself comprises one or more horizontal rows or "records" (tuples) 255 together with vertical columns or "fields." A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing EMPLOYEE table, for example, Position is one field, Date Hired is another, and so on. With this format, tables are easy for users to understand and use. Moreover, the flexibility of tables permits a user to define relationships between various items of data, as needed.

During a database session or "connection" with the Server, each Client issues one or more SQL commands to the Server. SQL commands may specify, for instance, a query for retrieving particular data (i.e., data records meeting the query condition) from the table 250. The syntax of SQL (Structured Query Language) is well documented; see, e.g., the abovementioned *An Introduction to Database Systems*. In addition to retrieving the data from Database Server tables, the Clients also include the ability to insert new rows of data records into the table; Clients can also modify and/or delete existing records in the table.

During system operation, the SQL statements received from the one or more Clients 210 (via Network 220) are processed by one or more Engines 235 of the Database Server System 240. As shown in FIG. 2B, each Engine itself (e.g., Engine instance 235) comprises corresponding instances of a Parser 261, Normalizer 263, Compiler 265, Execution Unit 268, and Access Methods 269. Specifically, the SQL statements are passed to the Parser 261 which converts the statements into a query tree—a binary tree data structure which represents the components of the query in a format selected for the convenience of the system. In this regard, the Parser 261 employs conventional parsing methodology (e.g., recursive descent parsing).

The query tree is normalized by the Normalizer 263. Normalization includes, for example, the elimination of redundant data. Additionally, the Normalizer performs error checking, such as confirming that table names and column names which appear in the query are valid (e.g., are available and belong together). Finally, the Normalizer can also look up any referential integrity constraints which exist and add those to the query.

After normalization, the query tree is passed to the Compiler 265, which includes an Optimizer 266 and a Code Generator 267. The Optimizer is responsible for optimizing the query tree. The Optimizer performs a cost-based analysis for formulating a query execution plan. The Optimizer will, for instance, select the join order of tables (e.g., when working with more than one table); it will select relevant indexes (e.g., when indexes are available). The Optimizer, therefore, performs an analysis of the query and picks the best execution plan, which in turn results in particular ones of the Access Methods being invoked during query execution.

The Code Generator 267, on the other hand, converts the query tree into a set of instructions suitable for satisfying the query. These instructions are passed to the Execution Unit 268. Operating under the control of these instructions, the Execution Unit 268 generates calls into lower-level routines, such as the Access Methods 269, for carrying out the query-specified operation, such as fetching relevant information (e.g., row 255) from the database table 250. After the plan has been executed by the Execution Unit, the Server returns a query result or answer table back to the Client(s).

For enhancing the speed in which the Database Server stores, retrieves, and presents particular data records, the Server maintains one or more database indexes 245 on the table. A database index, typically maintained as a B-Tree data structure, allows the records of a table to be organized in many different ways, depending on a particular user's needs. An index may be constructed as a single disk file storing index key values together with unique record numbers. The former is a data quantity composed of one or more fields from a record; the values are used to arrange (logically) the database file records by some desired order (index expression). The latter are unique pointers or identifiers to the actual storage location of each record in the database file. Both are referred to internally by the system for locating and displaying records in a database file. As clients insert more and more data into a particular one of the table(s) 250, a corresponding one of the index(es) 245 continues to grow.

Client/server environments, database servers, and networks are well documented in the technical, trade, and patent literature. For a general discussion of database servers and client/server environments, see, e.g., Nath, A., *The Guide to SQL Server*, Second Edition, Addison-Wesley Publishing Company, the disclosure of which is hereby incorporated by reference.

B. Database data storage structures: data pages and page chain

Figure 3:
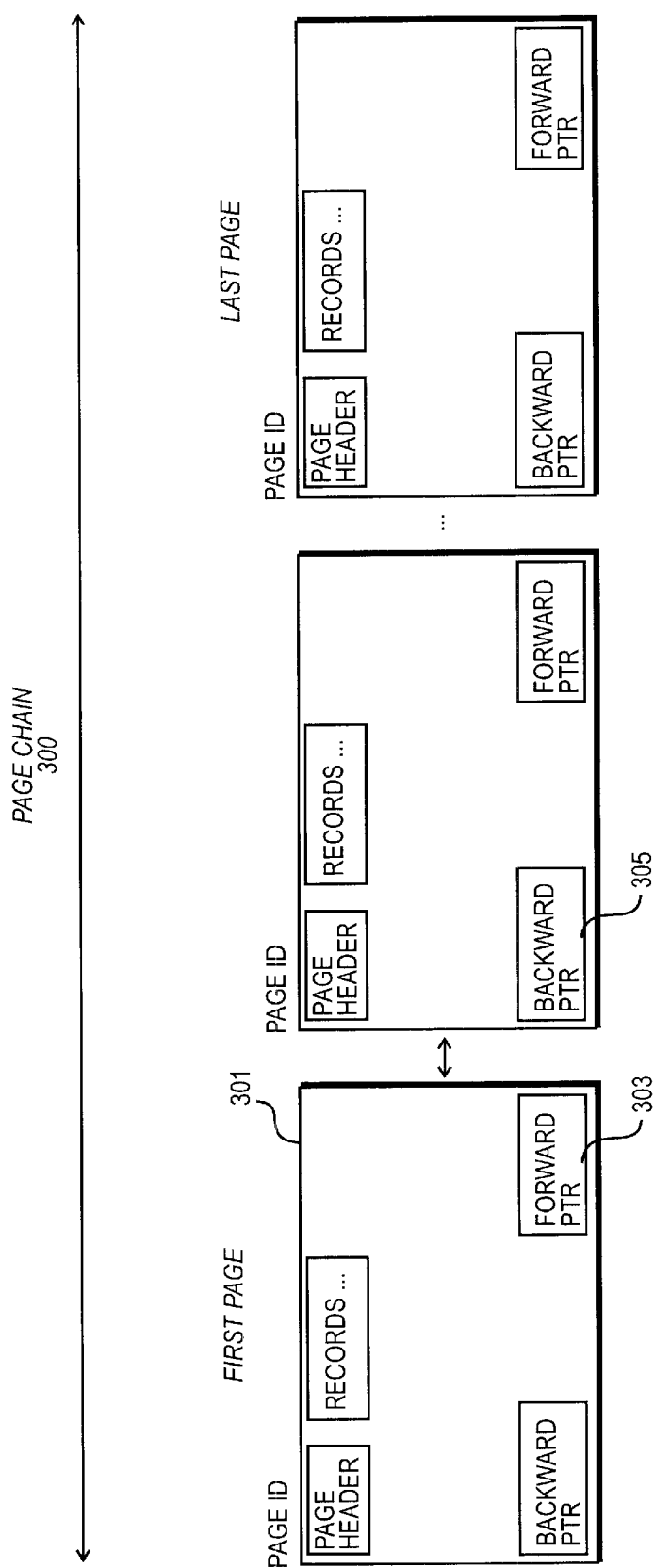
FIG. 3 is a block diagram illustrating a structure for storing data records, such as a "data page."

As shown in FIG. 3, the data records or rows of a database table are actually stored in a particular structure known as a "data page." A data page may be viewed as a storage unit (e.g., 2K storage block) which holds one or more records, such as page 301. When a data page is "full," typically on the order of about 50 to 100 records, it is necessary to allocate a new data page. Every page which is allocated is linked to its previous and next neighboring pages via forward and backward page pointers (e.g., pointers 303, 305), so that logically a linked list or "chain" of pages exists. This forms the "page chain," such as the page chain 300 shown in FIG. 3. Typically, identifiers or "Page IDs" for the first and last page of a page chain are maintained in a system catalog for the database.

Conventionally, only a single page chain is employed for a given object. A more advanced approach is to employ multiple page chains for a given object. Such an approach is described in commonly-owned, co-pending application Ser. No. 08/537,020, Database System with Methods for Partitioning an Object into Multiple Page Chains, filed Oct. 2, 1995, now U.S. Pat. No. 5,717,919, the disclosure of which is hereby incorporated by reference. It should be noted, however, that linking all data pages in a page chain is not required. Sybase Adaptive Server Enterprise™ (ASA 11.9), for example, introduced new types of tables called "data only locked tables," in which data pages may not be linked in a page chain. A special data structure called object allocation map (OAM) is used to track data page IDs. If there is a need to scan all data pages, the OAM is consulted.

Improved Methodology for Optimizing Page Allocation

A. Introduction

In an environment with a large number of clients performing a large number of transactions (e.g., inserts, updates, and deletes), such as an OLTP application executing hundreds of transactions per minute for providing e-commerce support, a huge number of page splits occur. In such a scenario, the system must frequently access the database's allocation pages in order to update the information pertaining to page-management housekeeping. Each allocation page is protected in this concurrent environment using a latch. In a conventional high-transaction environment, the latch protecting access to the database's first-available allocation page becomes a substantial bottleneck.

An allocation page is an accounting or housekeeping mechanism pertaining to a database. Every database has its own set of allocation pages. A database's allocation pages store information about how many pages have been used by the database, how many are available for use, and the like.

Although an allocation page does not hold user data, it is often involved in database operations. Consider, for instance, a database operation leading to insertion of a new data record to into an existing data page of a database. For a given data page, only a finite number of records or rows can fit. Therefore, once the page is filled, a new data page must be allocated to receive any additional data records that are to be inserted into the database. Here, the database system retrieves an unused data page (e.g., from a pool of "free" data pages) and then, in order to maintain proper linkage of data pages for a given table, links that data page into the database's chain of data pages.

Figure 4:
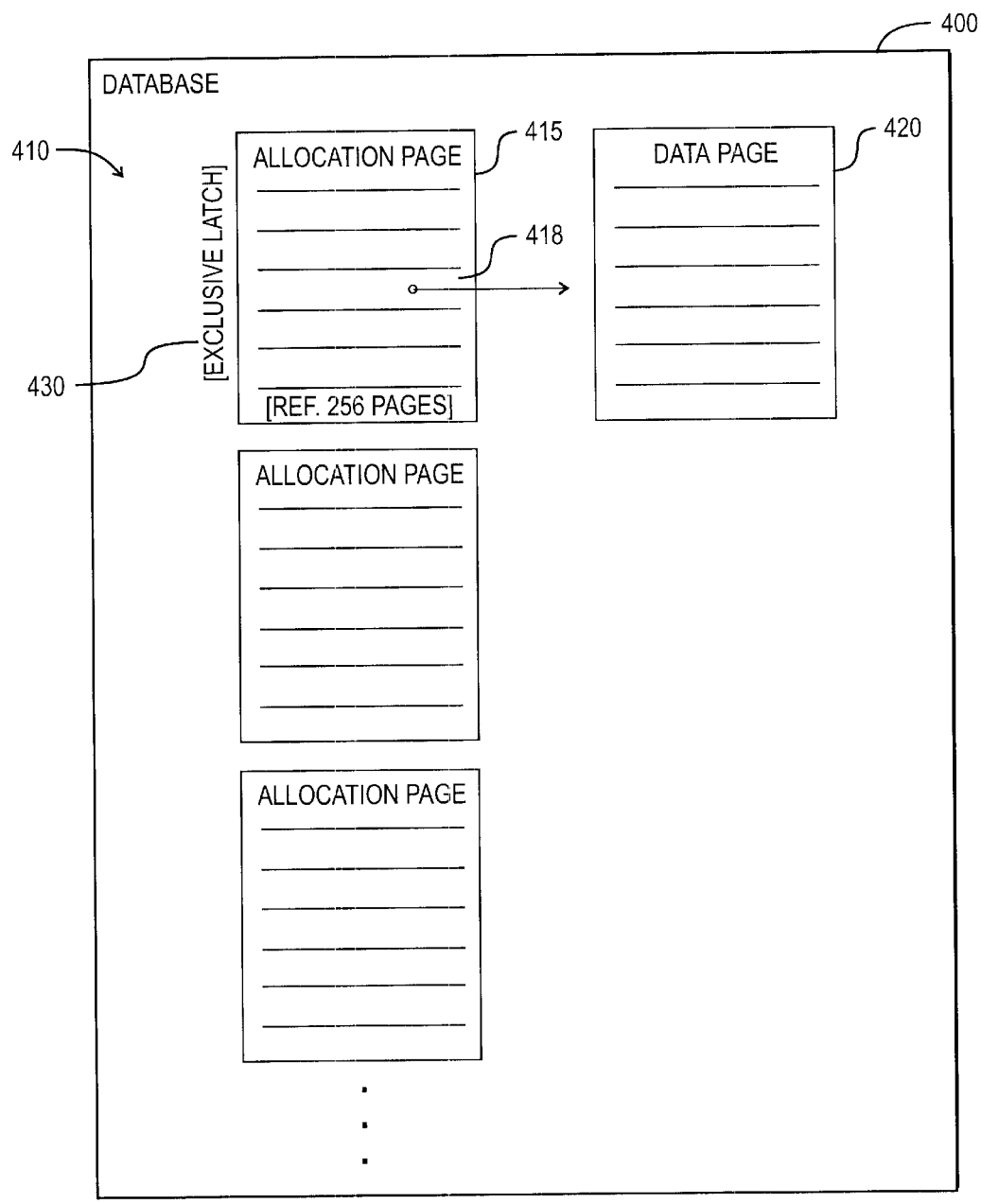
FIG. 4 is a block diagram illustrating page allocation data structures, which are employed for housekeeping purposes.

Each allocation page serves, in essence, as a free list of pages (e.g., data pages) available. In the embodiment of Sybase Adaptive Server, for example, each allocation page may list up to 256 free pages. As illustrated in FIG. 4, for instance, database 400 includes a collection of allocation pages 410. Each allocation page itself, in turn, references a plurality of pages (e.g., data pages) for use within the database 400. As shown, for example, allocation page 415 includes an entry 418 that references a data page 420. In this manner, other entries of the allocation page 415 (as well as other entries of other allocation pages 410) reference data pages for use within the database.

As also shown, each allocation page is protected by an exclusive latch. For allocation page 415, for instance, latch 430 is provided. In order to acquire exclusive access to the allocation page 415, the latch 430 must be acquired in exclusive mode. "Latches" are like short term locks and are a mechanism used to guarantee physical consistency of pages. Thus, the latches themselves represent a synchronization mechanism, somewhat "lightweight" in comparison to a "lock", that is useful in instances where there are multiple readers and one writer. Latches may be either shared or exclusive. When acquiring a latch for purposes of reading, the latch may be shared. When acquiring a latch for purposes of writing, on the other hand, the latch must be exclusive. In the instance of allocation pages, when an allocation page is retrieved from disk into memory for modification (e.g., adding new entries describing page allocation housekeeping information), it is returned with an exclusive latch. Therefore, when contention exists for an allocation page, what really exists is contention for the latch that protects that allocation page. Latches are held for a short-duration. For example, a latch is held only for the duration of modification of a page or duration of read (operation) from the page; they are not held for the duration of the transaction. Further description of latches may be found in commonly-owned patent application Ser. No. 09/364,981, filed Jul. 31, 1999, the disclosure of which is hereby incorporated by reference.

In the context of a high-volume transaction system (e.g., OLTP), a multitude of database clients are performing transactions concurrently against a single database, thereby causing a huge number of page splits to occur (e.g., as a result of multiple insert operations). By virtue of this scenario, the database system is constantly requiring access to an allocation page for updating associated housekeeping information. Since the conventional approach is to traverse a chain of allocation pages and grab the first available allocation page, the net result is that the latch protecting the allocation page becomes a single point of contention in a high-volume transaction environment.

B. Functional description of page allocation

Figure 5A:
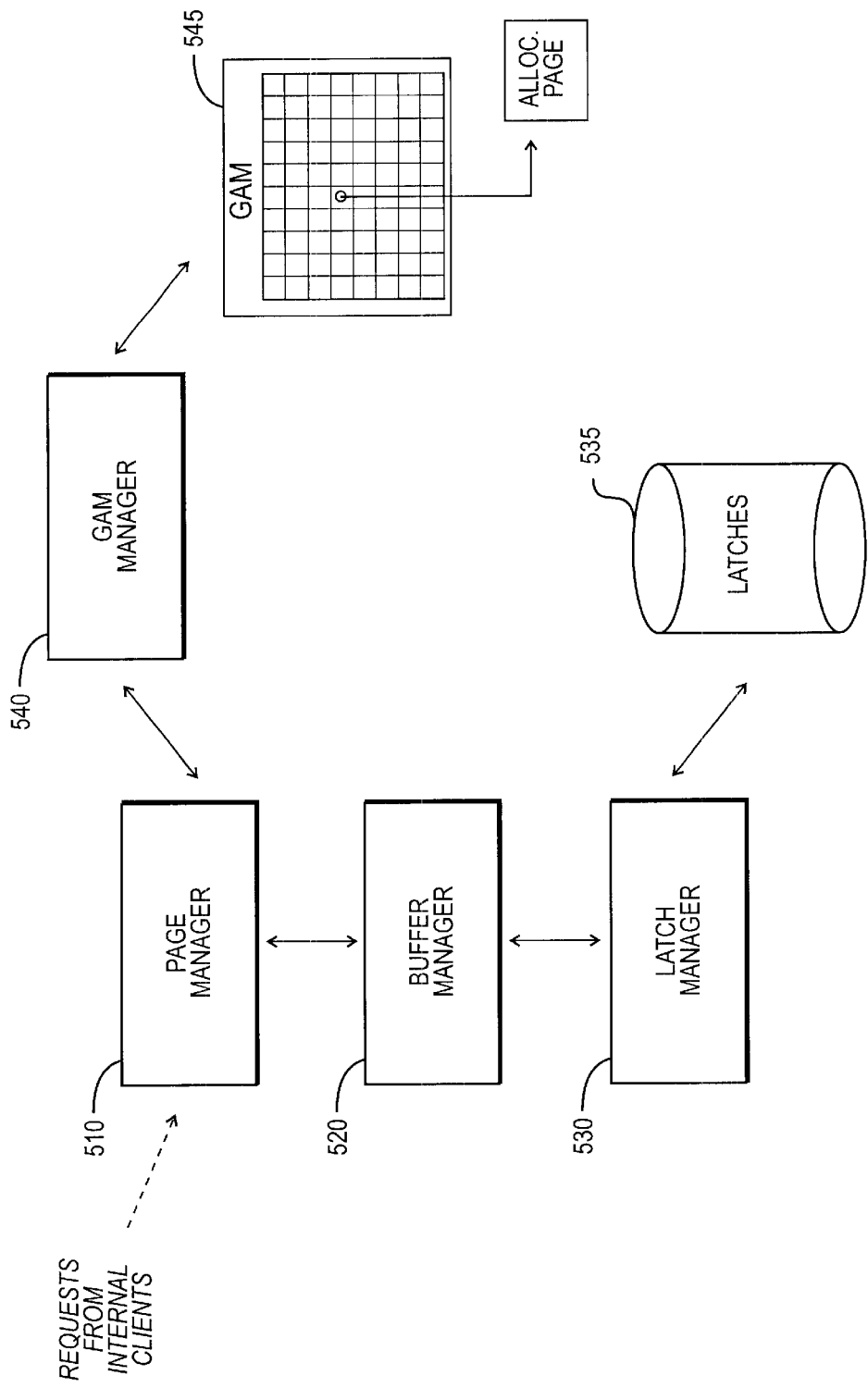
FIG. 5A is a block diagram illustrating functional components of the database system involved in page allocation.

Referring now to FIG. 5A, the functional components of the database system involved with page allocation will now be described in further detail. As shown, Page Manager 510 communicates with Buffer Manager 520 which, in turn, communicates with Latch Manager 530, for the purpose of securing a latch to an allocation page. In other words, as part of returning a buffer, the system returns it latched or not latched. The Latch Manager 530, in response to such a request, determines whether it can grant the latch. In doing so, the Latch Manager 530 draws from a pool of latches, such as latch pool 535, which are used to protect critical shared resources. If the Latch Manager 530 cannot grant the latch request, it will typically put the requesting process to sleep (i.e., sleep on the latch request) or allow the process to spin. The overall process at this point is being driven by the Page Manager 510, which is operating in response to a request from an internal client (e.g., Access Methods). For example, the Page Manager 510 may need to allocate a new page based on a client request to insert new records (which have caused a page split).

Figure 5B:
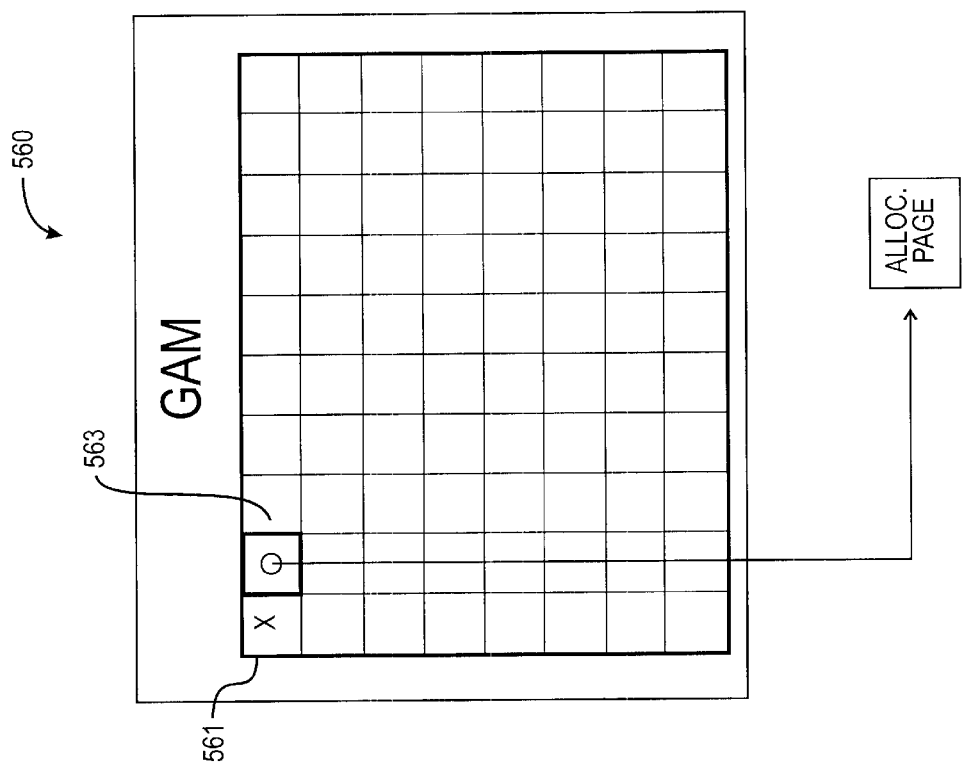
FIG. 5B is a block diagram illustrating a global allocation map (GAM), which is employed for tracking allocation pages, including identifying ones having available "free space".

The foregoing process operates in conjunction with a "GAM" manager 540, which is in communication with the Page Manager 510. The GAM manager 540, which controls a Global Allocation Map or GAM 545, is the component that is, in effect, "tricked" into returning a different allocation page each time. The GAM 545 itself is a single shared resource providing a map indicating how pages are allocated for the database. The allocation unit is ultimately obtained by the Page Manager from the GAM 540, through the GAM manager 540. The layout or structure of the GAM itself is shown in FIG. 5B. The global allocation map (GAM) 560 comprises a bitmap representing allocation pages, indicating which are full and which are available. Thus, the GAM 560 represents an index into the allocation pages for a database. Based on the status of an allocation page's given bit, the system can determine whether the allocation page is available. For example, the bit is set at bit position 561; therefore, the corresponding allocation page represented by that bit is not available (i.e., does not reference available free space). Conversely, the bit is not set at bit position 563. This indicates that that allocation page is, on the other hand, available for use. During page allocation operations of the database, the system will scan the GAM looking for an available allocation page. Without further enhancements to the underlying page allocation process, however, multiple clients seeking page allocation will inevitably end up with the same allocation page (as it is the first one with available free space) and, thus, will end up serializing on a single allocation page latch. If the clients could somehow be directed to other allocation pages, then the foregoing problem could be avoided. This may be accomplished by implementing a "greedy page allocation" scheme of the present invention which will now be described in further detail.

C. "Greedy page allocation" scheme

1. Overview of Basic Approach

Figure 6A:
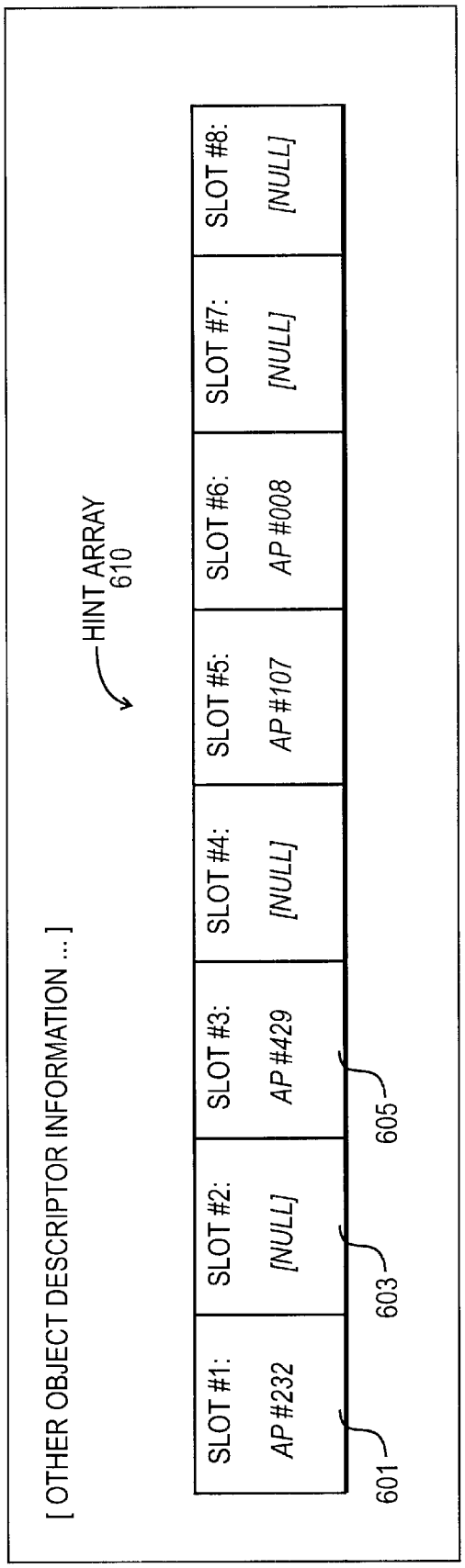
FIG. 6A is a block diagram illustrating an allocation hint array, that provides a cache of allocation page identifiers (obtained from the GAM).

During page allocation, once an allocation page with free space has been located in the GAM, the page identifier for that allocation page is stored in an object descriptor or des. For a table undergoing a lot of splits (i.e., insert-intensive object), the system may store an array of allocation page "hints" (allocation page identifiers) in the des for that object (e.g., table). As shown in FIG. 6A, object descriptor (des) 600 includes a des "hint" array 610 storing allocation hints. The array itself comprises a cache of slots (e.g., eight slots), each of which stores an allocation page identifier ("hint") obtained from the GAM (from a GAM traversal occurring during the page allocation process) or is empty (i.e., has not been filled from the GAM and is therefore set to the initial value of null). For example, the first slot (601) stores the page identifier "232". The next slot (603) has yet to be filled and, therefore, is empty. The third slot shown (605) stores the page identifier "429". On subsequent passes through the page allocation process, the system can, rather than going to the GAM, randomly select (e.g., randomly hash on) a particular slot of the cache. The random hash may be done in a conventional manner, such as using the Standard C/C++ rand function; see e.g., Ellis, M. and Stroustrup, B., *The Annotated C++ Reference Manual*, Addison-Wesley, 1990, the disclosure of which is hereby incorporated by reference. In this manner, the incoming clients will, instead of competing for the same first-available allocation page, randomly select among multiple available allocation pages. Since each allocation page itself is protected by a separate latch, the system is able to decrease contention during the page allocation process by randomly accessing different elements of the array.

2. Other Allocation Page Data Structures

Figure 6B:
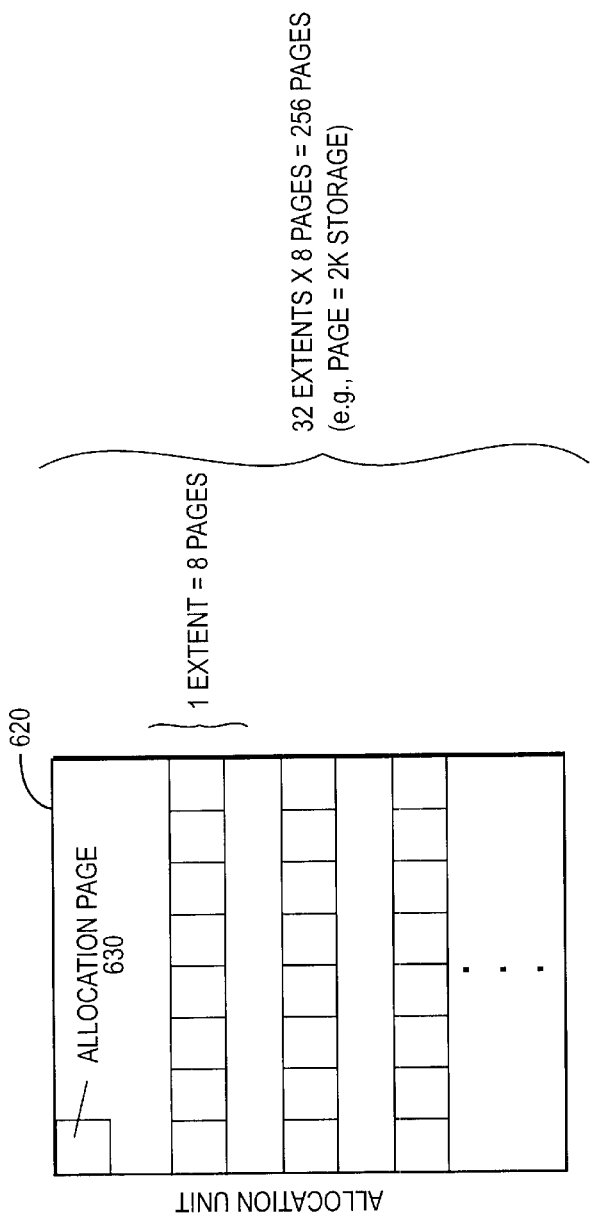
FIG. 6B is a block diagram illustrating layout of an allocation unit, including an allocation page and associated data pages.

It is also helpful to review the other underlying data structures specifically involved in the page allocation process. FIG. 6B is a block diagram illustrating the basic unit of storage allocation in the system—allocation unit 620—that includes an page allocation data structure 630 for managing page allocation. Here, the allocation page tracks 256 data pages. As each data page itself stores (by default) 2 K, the allocation page references 512 K of storage. This is further organized by grouping pages into "extents." Each allocation unit holds 32 extents, with each extent holding eight pages (i.e., 32 extents×8 pages/extent=256 pages). Object storage is not mixed within a given extent. For a given object, all of the pages of an extent can only be allocated to that object. For example, given table T1 and T2, the system will not allow both of those tables to share a given extent. Instead, the pages for each table must be stored in an extent that is specific for that table.

Figure 6C:
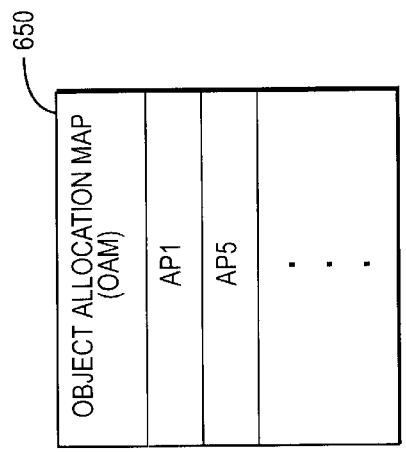
FIG. 6C is a block diagram illustrating layout of an object allocation map (OAM) data structure.

The allocation unit and page allocation data structure operate in conjunction with an object allocation map (OAM). This data structure is illustrated by OAM 650, shown in FIG. 6C. This data structure indicates which allocation pages are being used by a given object, such as a table or index. As a result, certain allocation pages may be dedicated for use by a particular object. As illustrated by OAM 650, this data structure contains a list of allocation pages that are specific for its object. For example, OAM 650 contains entries showing that the object has pages from allocation page #1 (ap1) and allocation page #2 (ap2). In this fashion, the OAM serves as a data structure that the object may consult for determining which allocation pages it can expect to get free space.

3. Basic Page Allocation Process

Prior to consulting the GAM (through the GAM manager), the Page Manager 510 will perform some initial steps. The requesting client (i.e., the accessing task) will provide a "hint" in the form of a target allocation page, as an indication of where it desires to get the allocation page from. Here, based on the hint, the GAM manager can decide which allocation page it should return. The hint is an internally-generated page number indicating what the next allocated page should be (from the perspective of the requesting client). For example, if the client is processing a heap table, it knows what the last page was. In such a case, it will formulate a hint requesting the next successive page (i.e., last page plus 1), so that during a scan operation the database system will fetch contiguous pages.

With a given hint, the system may now check whether it has the sought-after page available (in a particular extent). In the event that the system is not able to find an unused page in a given extent, the system will now check the remaining extents (e.g., a linear scan of the other 31 extents) to locate any available free space. Given that object storage cannot be mixed within an extent, however, it is possible that one may not be able to get all of the extents of a given allocation page available for a given object. In effect, certain pages may already in fact be dedicated for use by another object. In the event that the system is not able to find an unused page in the target allocation page at all, the system then attempts to find a page by performing a scan of the entire OAM. However, it is still possible that the system is unable to find available free space. In such a case, the system will now go to the GAM, to secure additional free space. Thus, requesting free space from the GAM is the final (high level) step in the page allocation process. As one progresses along this process, each step along the way becomes computationally more expensive.

4. Implementation of "Greedy" Allocation Process

Figure 7A:
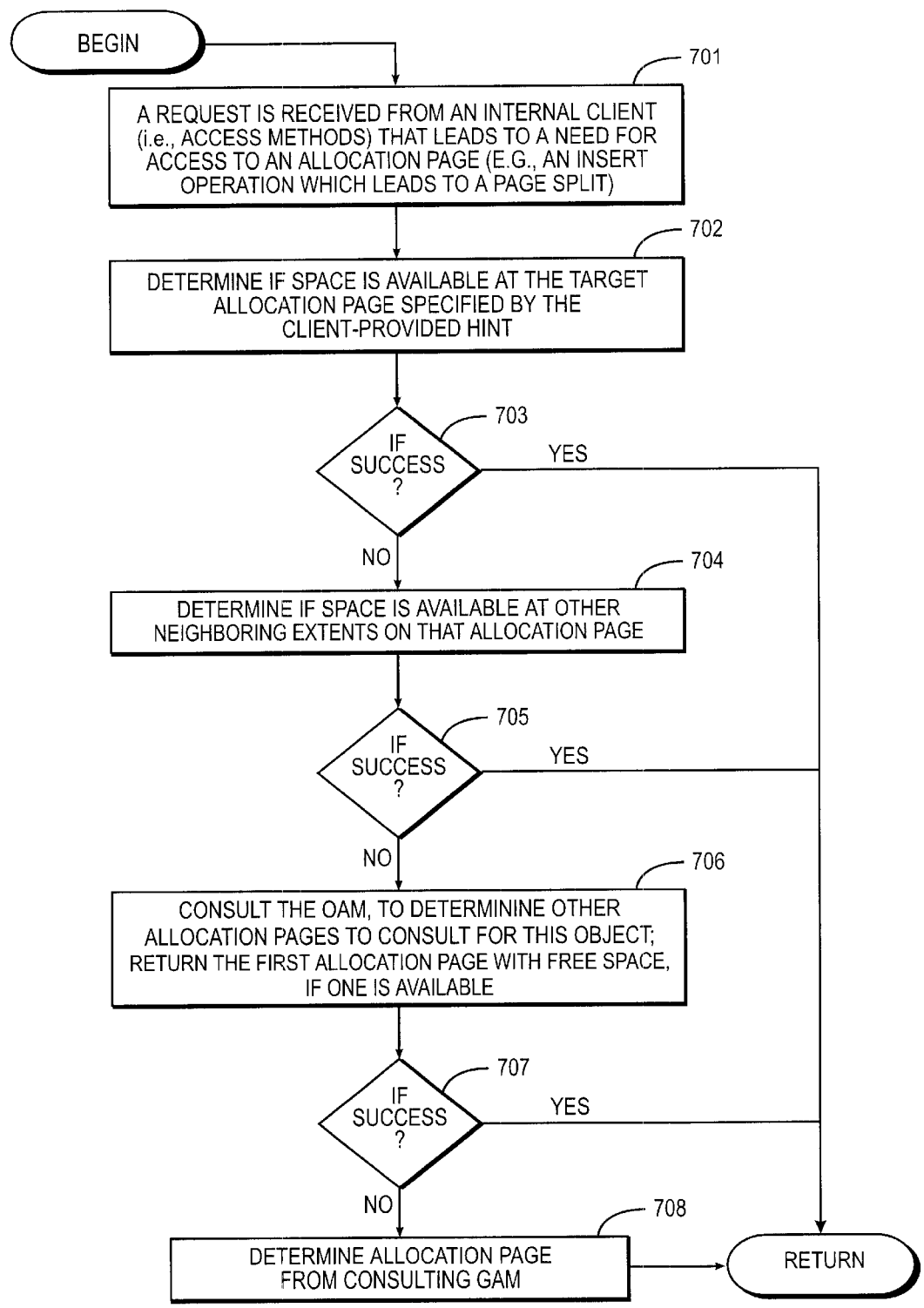
FIGS. 7A–B comprise a flowchart illustrating method steps of the present invention for improved page allocation.
Figure 7B:
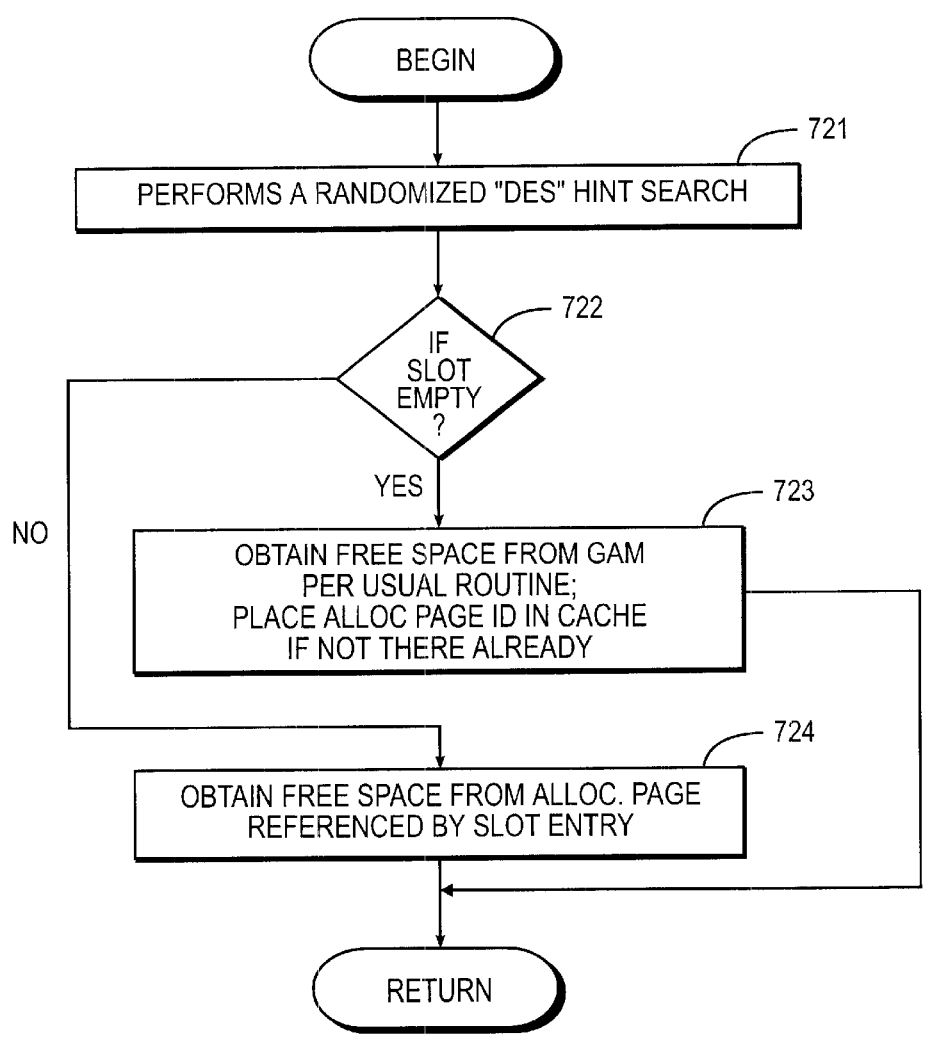

In accordance with the present invention, the page allocation process is redesigned such that the various clients need not compete for the same allocation page. Referring now to FIGS. 7A–B, an improved page allocation process in accordance with the present invention will now be described. At the outset, at step 701, a request is received from an internal client (i.e., Access Methods) that leads to a need for access to an allocation page (e.g., an insert operation which leads to a page split). Ultimately, this request arrives at the Page Manager, which must secure the new page. Now, the Page Manager attempts page allocation based on the passed-in hint, as follows. At step 702, the system determines if space is available at the target allocation page specified by the client-provided hint. If the system is successful at this point, tested at step 703, the sought-after page may be returned to the Page Manager. Otherwise at this point, the system will scan the other neighboring extents on that allocation page, in an effort to locate free space (i.e., an available page), as shown at step 704. If no free space is located, tested at step 705, the system now proceeds to consult the OAM, shown at step 706, for determining other appropriate allocation pages to consult for this object. Recall that the OAM contains entries comprising allocation page identifiers which, in effect, serve as "OAM hints" indicating where the system can expect to (potentially) find free space for the object (e.g., based on extents that already have been reserved for that object). Here, the system will return the first allocation page with free space, if one is available, as shown by the "yes" condition of step 707.

If free space has yet to be located ("no" condition of step 707), the system will now proceed to step 708 to consult the GAM, which has been enhanced by a cache or array of allocation page entries or hints. The substeps involved in step 708, which are shown in FIG. 7B, are as follows. Now, the system performs a randomized des hint search, at step 721. In operation, the method randomly hashes on a slot of the available slots (e.g., eight slots). The selected slot itself may now be processed as follows. If the slot is empty (i.e., it has not been filled with an allocation page identifier), tested at step 722, then the method will continue with the remaining steps of page allocation. In such an instance, the method consults the GAM proper (i.e., the underlying map), for obtaining free space, as indicated by step 723. When a database session first gets underway, all of the slots will be initially empty, so the method will typically proceed, at the very outset, with the whole page allocation process.

In those instances where the method encounters an empty slot, the method proceeds to the GAM and returns the first allocation page (with available free space) that is not already in the cache. Duplicates are not stored in the cache, so as to guarantee that the hints are unique. When at the GAM, the method performs a linear search of the array of hints to find out whether the allocation page that the system is planning to return does not already have an entry in the cache (slots). If the allocation page (identifier) already exists as an entry in the cache, then the method skips that allocation page and proceeds to the next.

Figure 8:
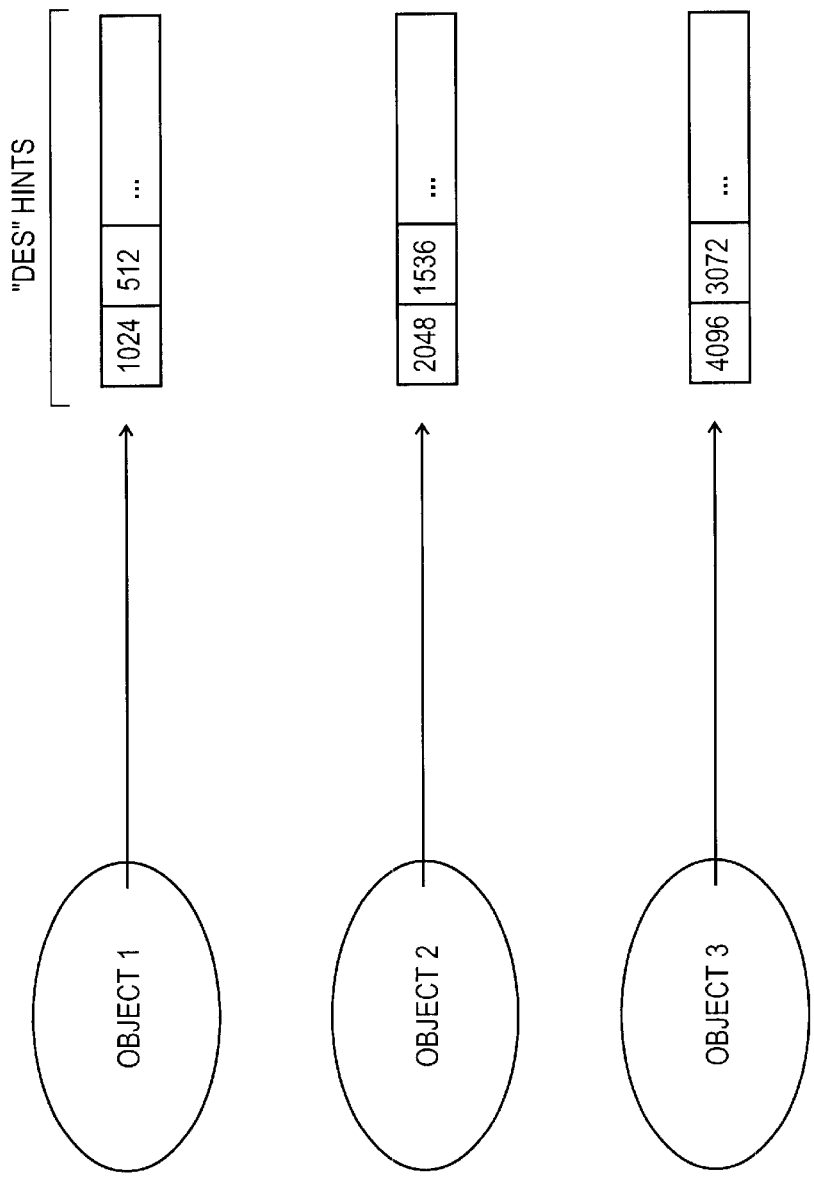
FIG. 8 is a block diagram illustrating advantages of the allocation methodology of the present invention, particularly among multiple objects requiring allocation.

During system operation, the slots fill up rather quickly. Therefore, the process of randomizing on slots yields a cached allocation page identifier. This is indicated by the "no" condition of step 722, where the method has proceeded to step 724 to obtain free space from the allocation page that is referenced by the hashed-to slot entry. Here, the method is able to avoid the computationally-expensive process of obtaining an allocation page from the GAM as well as decreasing contention for a particular allocation page, thus providing a highly beneficial optimization D. Advantage of greedy page allocation scheme The greedy page allocation approach of the present invention solves the problem of the allocation page bottleneck by decomposing the allocation page latch and directing each task coming for page allocation to a different allocation page based on a random number functional or generator. Consider, for instance, the objects illustrated in FIG. 8. As shown, Objects 1, 2, and 3 have allocation page hints stored in an associated cache for them. When a page allocation happens, say for Object 1 on account of numerous inserts, the system consults the appropriate allocation page hints and is almost certain to find free space.

A particular advantage of the approach is that, once the allocation page identifiers are cached, the system need not proceed along the computationally-expensive process of page allocation. Instead, a multitude of pages (e.g., 256) are available in each allocation page, and multiple allocation pages are available in the cache. Concurrent page allocations can proceed through different allocation pages without having to contend with each other. In other words, a particular allocation page itself has less contention for it, therefore, the system may avoid more costly page allocation steps.

Appened herewith is Computer Program Listing Appendix containing C-language source code listings providing further description of the present invention. A C-language programming enviroment suitable for compiling and linking C code is available from a variety of vendors including Microsoft Corporation of Redmond, Wash. and Sun Microsystems of Mountain View, Calif.

While the invention is described in some detail with specific reference to a single-preferred embodiment and certain alternatives, there is no intent to limit the invention to that particular embodiment or those specific alternatives. For instance, those skilled in the art will appreciate that the number of slots employed need not equal eight but instead may range considerably (e.g., from 2–64) without departing from the teachings of the present invention.

What is claimed is:

1. In a database system having a database comprising database objects, each object itself comprising a plurality of pages, the database including allocation pages for tracking allocation of pages for objects, an improved method for allocating data pages, the method comprising:

maintaining an allocation data structure indicating allocation pages that references pages with free space;

maintaining on a per object basis a cache memory comprising a plurality of slots, each for storing a page identifier indicating an allocation page that reference pages with suitable free space;

in response to a database operation requiring allocation of a page for a particular object, randomly selecting one of the slots of said cache memory for that particular object;

obtaining an allocation page identifier from the selected slot, if an identifier is available from that slot, otherwise, obtaining an allocation page identifier from said allocation data structure; and accessing the corresponding allocation page referenced by the obtained allocation page identifier for allocating a new data page for the particular object.

2. The method of claim 1, further comprising:

storing said obtained allocation page identifier in the selected slot for subsequent retrieval from the cache memory.

3. The method of claim 1, wherein said particular object comprises a database table.

4. The method of claim 1, further comprising:

repeating the steps for a plurality of database operations, wherein most of the allocation page identifiers obtained are retrieved from the cache memory.

5. The method of claim 1, wherein a plurality of cache memories are created, each one specific to an object requiring page allocation.

6. In a database system having a database comprising database tables, each table itself comprising a plurality of data pages, the database including allocation pages for tracking allocation of data pages, an improved method for allocating data pages, the method comprising:

maintaining an allocation map storing allocation page identifiers for allocation pages, including storing information about allocation pages that reference data pages with free space available;

maintaining a cache memory comprising a plurality of slots for storing allocation page identifiers obtained from the map;

in response to a request from a client for page allocation, randomly selecting one of the slots of said cache memory;

if the selected slot is empty,
obtaining an allocation page identifier from said allocation map, and
storing said obtained allocation page identifier in the selected slot for subsequent retrieval from the cache memory;

if the slot is not empty, obtaining an allocation page identifier that is stored by the slot;

accessing the particular allocation page referenced by the allocation page identifier that is obtained; and based on the access to the particular allocation page, allocating a new data page.

7. The method of claim 6, wherein said cache memory is associated with a particular table.

8. The method of claim 6, further comprising:

repeating the steps for a plurality of client requests, wherein most of the requests can be satisfied by page identifiers present in the cache memory.

9. The method of claim 6, wherein a plurality of cache memories are created, each one specific to an object requiring page allocation.

10. The method of claim 6, wherein each allocation page references 256 data pages.

11. The method of claim 6, wherein said allocation map stores information indicating whether a particular allocation page referenced by the allocation map references data pages with available free space.

12. The method of claim 6, wherein each data page stores 2K.

13. The method of claim 1, wherein said cache memory comprises at least 8 slots.

14. The method of claim 6, wherein each slot initially stores a null value for indicating that the slot is empty.

15. The method of claim 6, wherein said step of randomly selecting includes invoking a random number function.

16. The method of claim 6, wherein said step of obtaining an allocation page identifier from said allocation map includes:

scanning said allocation map for locating an allocation page that references data pages having free space.

17. The method of claim 6, wherein said allocation map comprises a bit map.

18. The method of claim 17, wherein, in said allocation map, a bit is set for those allocation pages corresponding to data pages not having available free space.

19. The method of claim 6, wherein said data pages exist in a single shared memory available to a plurality of processes.

20. The method of claim 6, wherein access to each allocation page is protected by a latch.

21. A database system with improved allocation of data pages, the system comprising:

a computer providing a database comprising database tables, each table itself comprising a plurality of data pages, the database including allocation pages for tracking allocation of data pages;

an allocation map for storing allocation page identifiers for allocation pages, including storing information about allocation pages that reference data pages with free space available;

a cache memory comprising a plurality of slots for storing allocation page identifiers obtained from the map;

program logic for randomly selecting one of the slots of said cache memory in response to a request from a client for page allocation and, if the selected slot is empty, obtaining an allocation page identifier from said allocation map and storing said obtained allocation page identifier in the selected slot for subsequent retrieval from the cache memory;

program logic for obtaining an allocation page identifier that is stored by the slot if the slot is not empty; and program logic for accessing the particular allocation page referenced by the obtained allocation page identifier and, based on the access to the particular allocation page, allocating a new data page.

22. The system of claim 21, wherein said cache memory is associated with a particular table.

23. The system of claim 21, wherein said computer includes multiple processors.

24. The system of claim 21, further comprising a plurality of cache memories, each one specific to an object requiring page allocation.

25. The system of claim 21, wherein each allocation page references 256 data pages.

26. The system of claim 21, wherein said allocation map stores information indicating whether a particular allocation page referenced by the allocation map references data pages with available free space.

27. The system of claim 21, wherein each data page stores 2K.

28. The system of claim 21, wherein said cache memory comprises at least 8 slots.

29. The system of claim 21, wherein each slot initially stores a null value for indicating that the slot is empty.

30. The system of claim 21, wherein said program logic for randomly selecting includes invoking a random number function.

31. The system of claim 21, wherein said program logic for obtaining an allocation page identifier from said allocation map includes:
  program logic for scanning said allocation map for locating an allocation page that references data pages having free space.

32. The system of claim 21, wherein said allocation map comprises a bit map.

33. The system of claim 32, wherein, in said allocation map, a bit is set for those allocation pages corresponding to data pages not having available free space.

34. The system of claim 21, wherein said data pages exist in a single shared memory available to a plurality of processes.

35. The system of claim 21, wherein access to each allocation page is protected by a latch.

* * * * *